(12) United States Patent
Mano et al.

(10) Patent No.: US 10,741,880 B2
(45) Date of Patent: Aug. 11, 2020

(54) LAMINATED RECHARGEABLE ELEMENT

(71) Applicant: FDK CORPORATION, Tokyo (JP)

(72) Inventors: Tsukasa Mano, Tokyo (JP); Naoaki Nishimura, Tokyo (JP); Yuya Iida, Tokyo (JP); Ryuji Ito, Tokyo (JP)

(73) Assignee: FDK CORPORATION, Tokyo (JP)

( * ) Notice: Subject to any disclaimer, the term of this patent is extended or adjusted under 35 U.S.C. 154(b) by 153 days.

(21) Appl. No.: 15/946,731

(22) Filed: Apr. 6, 2018

(65) Prior Publication Data

US 2018/0226688 A1 Aug. 9, 2018

Related U.S. Application Data

(63) Continuation of application No. PCT/JP2016/079867, filed on Oct. 6, 2016.

(30) Foreign Application Priority Data

Oct. 6, 2015 (JP) ................................. 2015-198151

(51) Int. Cl.

| H01M 8/00 | (2016.01) |
| H01M 10/0585 | (2010.01) |
| H01G 11/52 | (2013.01) |
| H01G 11/78 | (2013.01) |
| H01M 2/02 | (2006.01) |
| H01M 10/052 | (2010.01) |
| H01M 2/16 | (2006.01) |
| H01G 11/82 | (2013.01) |
| H01G 11/24 | (2013.01) |

(Continued)

(52) U.S. Cl.

CPC ........ H01M 10/0585 (2013.01); H01G 11/24 (2013.01); H01G 11/52 (2013.01);

(Continued)

(58) Field of Classification Search

CPC ........... H01M 10/0585; H01M 10/052; H01M 2/0207; H01M 2/021; H01M 2/0212;

(Continued)

(56) References Cited

U.S. PATENT DOCUMENTS 6,465,125 B1 10/2002 Takami et al.
6,743,546 B1 6/2004 Kaneda et al.
(Continued)

FOREIGN PATENT DOCUMENTS

JP 2000156209 A 6/2000
JP 2000251944 A 9/2000
(Continued)

OTHER PUBLICATIONS

FDK Corporation, "Thin Type Primary Lithium Batteries", searched on Sep. 16, 2015, Japanese Website: <http://www.fdk.co.jp/battery/lithium/lithium_thin.html>; English Website: <http://www.fdk.com/battery/lithium_e/lithium_thin.html>.

(Continued)

*Primary Examiner* — Jane J Rhee
(74) *Attorney, Agent, or Firm* — Isshiki International Law Office; Joseph P. Farrar, Esq.

(57) ABSTRACT

A laminated rechargeable element includes a jacket and an electrode assembly. The electrode assembly is accommodated in the jacket together with an electrolyte, and includes a separator, a sheet-shaped positive electrode and a sheet-shaped negative electrode. The electrode assembly is formed by laminating the positive electrode and the negative electrode with the separator interposed between the positive electrode and the negative electrode. The separator includes an ion-permeable substrate and ion-permeable bonding layers formed on a top surface and a bottom surface of the substrate. The positive electrode and the negative electrode are welded to respective bonding layers of the separator. The jacket is formed of two flat, rectangular stainless steel laminate films welding together at their peripheries, and is welded to the electrode assembly.

4 Claims, 4 Drawing Sheets

(51) Int. Cl.
    *H01G 11/58* (2013.01)
    *H01G 11/84* (2013.01)

(52) U.S. Cl.
    CPC ............ *H01G 11/78* (2013.01); *H01G 11/82* (2013.01); *H01M 2/021* (2013.01); *H01M 2/026* (2013.01); *H01M 2/0207* (2013.01); *H01M 2/0212* (2013.01); *H01M 2/0267* (2013.01); *H01M 2/0287* (2013.01); *H01M 2/168* (2013.01); *H01M 2/1653* (2013.01); *H01M 2/1686* (2013.01); *H01M 10/052* (2013.01); *H01G 11/58* (2013.01); *H01G 11/84* (2013.01); *H01M 2220/30* (2013.01)

(58) Field of Classification Search
    CPC .. H01M 2/026; H01M 2/0287; H01M 2/1653; H01M 2/168; H01M 2/1686; H01M 2220/30
    See application file for complete search history.

(56) References Cited

U.S. PATENT DOCUMENTS

| | | | | |
|---|---|---|---|---|
| 2003/0190499 | A1* | 10/2003 | Watanabe | H01M 2/1606 429/7 |
| 2006/0242799 | A1 | 11/2006 | Flossner | |
| 2007/0128513 | A1 | 6/2007 | Hatta et al. | |
| 2015/0171461 | A1* | 6/2015 | Akutsu | H01M 10/04 29/623.2 |

FOREIGN PATENT DOCUMENTS

| | | |
|---|---|---|
| JP | 2002175790 A | 6/2002 |
| JP | 2004052100 A | 2/2004 |
| JP | 2005-071658 A | 3/2005 |
| JP | 2006281613 A | 10/2006 |
| JP | 2007157460 A | 6/2007 |
| WO | 200059063 A1 | 10/2000 |

OTHER PUBLICATIONS

International Search Report (ISR) for Application No. PCT/JP2016/079867 dated Dec. 27, 2016.
Translation of the ISR for Application No. PCT/JP2016/079867 dated Dec. 27, 2016.
Written Opinion of the International Search Authority for Application No. PCT/JP2016/079867 dated Dec. 27, 2016.
Partial translation of Written Opinion of the International Search Authority for Application No. PCT/JP2016/079867 dated Dec. 27, 2016.
The Japanese Office Action for Application No. 2015-198151 dated Oct. 1, 2019.
The Japanese Office Action for Parent Application No. 2015-198151 dated Apr. 28, 2020.

* cited by examiner

LAMINATED RECHARGEABLE ELEMENT

CROSS-REFERENCE TO RELATED APPLICATIONS

This patent application is a continuation of International Application PCT/JP2016/079867, with an international filing date of Oct. 6, 2016, which in turn claims priority to Japanese Patent Application No. 2015-198151, filed on Oct. 6, 2015 in the Japan Patent Office, the entire disclosures of which are hereby incorporated by reference herein.

TECHNICAL FIELD

This disclosure relates to a laminated rechargeable element including the jacket which is made of laminate film and which accommodates a power-generating element.

BACKGROUND ART

In recent years, various thin electronic devices have come into practical use, for example, electronic paper, Integrated Circuit tags, smart cards, electronic keys or the like. As power sources for such thin electronic devices, laminated rechargeable elements (e.g., primary cells, secondary cells, electric double-layer capacitors), which can be made thin and small, are often used. Even for large-capacity rechargeable elements, such as the power supplies of electric cars or portable power supplies, there is demand for reducing mounting or installation space. Accordingly, for such large-capacity rechargeable elements, laminated rechargeable elements are widely used.

SUMMARY

FIGS. 1A and 1B show a laminated lithium primary battery as an example of a laminated rechargeable element 1. FIG. 1A is an external view of a laminated rechargeable element 1, and FIG. 1B is an exploded perspective view of the internal structure of the rechargeable element 1. In FIG. 1B, some of parts are hatched so as to distinguish them from other parts. The laminated rechargeable element 1 has a flat external shape, as shown in FIG. 1A. A positive terminal plate 23 and a negative terminal plate 33 project from a jacket 11 from one side of a flat, rectangular laminate film.

Inside the jacket 11, an electrode assembly 10 is sealed with an electrolyte as shown in FIG. 1B. The electrode assembly 10 is formed by press-bonding a sheet-shaped positive electrode 20 and a sheet-shaped negative electrode 30, which are laminated together with a separator 40 interposed between them. The positive electrode 20 is made by applying cathode material 22 in slurry form to a main surface of a cathode current collector 21 (made of metal foil, etc.) and drying it. The cathode material 22 is applied to a surface which faces the separator 40 of the cathode current collector 21 and contains an active cathode material such as manganese dioxide. In this example, a strip-shaped projection is formed on the cathode current collector 21 as a single unit together with the cathode current collector 21, and the tip end of this projection extends outside the jacket 11, such that the part that is exposed outside the jacket 11 becomes a positive terminal plate 23. The negative electrode 30 includes, as an active anode material, plate-shaped lithium metal or lithium alloy (hereinafter also referred to as a negative electrode lithium 32). The negative electrode lithium 32 is press-bonded to an anode collector 31 made of metal film including a projecting negative terminal plate 33 formed as a single unit with the anode collector 31.

The jacket 11 is formed by welding, in thermocompression bonding, the peripheries 12 of two sheets of rectangular, aluminum laminate films 11a, 11b which are stacked, and as a result the inside of the jacket is sealed. As procedures in which the jacket 11 accommodates the electrode assembly 10, the following example is provided: Two facing aluminum laminate films 11a, 11b are shaped into the form of a bag by welding three sides of the rectangle and by leaving the remaining side open; the bag-shaped, aluminum laminate films 11a, 11b accommodate the electrode assembly 10 with the electrolyte; the terminal plates 23, 33 of the positive and negative electrodes 20, 30 protrude beyond the jacket 11 from the opening of the bag-shaped aluminum laminate films 11a, 11b; and the periphery 12 on the opening side is welded, to finish the laminated rechargeable element 1 shown in FIG. 1A. The configuration of a laminated rechargeable element is described, for example, in Japanese Patent Application Publication No. 2006-281613. And, the following document describes the characteristics, discharge performance, etc. of thin lithium cells, which are laminated rechargeable elements: FDK Corporation, "Thin Lithium Primary Batteries", [online], [searched on Sep. 16, 2015], Internet <URL: http://www.fdk.co.jp/battery/lithium/lithium_thin.html> (hereinafter referred to as Non Patent Literature (NPL) 1).

As for a laminated rechargeable element, there is always a demand for reduction in thickness. But, making sheet-shaped positive and negative electrodes thinner leads to reduction in the amount of active material which contributes to discharge, making it impossible to ensure the necessary discharge capacity. Accordingly, the more practical approach is to make the aluminum laminate film constituting the jacket thinner. The aluminum laminate film is covered with resin layers, so that, basically, the laminated cell is provided with a resin layer (hereinafter referred to as a protection layer) for protecting aluminum film against mechanical impact (e.g., piercing, friction, bending). Inside the laminated cell, another resin layer (hereinafter referred to as a welding layer) is provided which is melted by thermocompression bonding at a time of sealing.

The protection layer of the laminate film will melt as well, in some cases, due to heat at the time of thermocompression bonding. When the protection layer has melted, there is a possibility that the exposed aluminum film is corroded by atmospheric moisture, etc., to produce pinholes. In the case of a rechargeable battery including negative electrode lithium (e.g., a lithium primary battery), when moisture gets inside the rechargeable element through the pinholes, the moisture reacts with lithium to produce hydrogen gas. If a large amount of gas is produced, the thickness of the jacket increases and this makes it impossible to maintain its original external design dimensions. In some cases, welded parts of the peripheries of laminate films are detached, causing leakage. Accordingly, in order to prevent the formation of pinholes, there are limits to how thin the protection layer and the aluminum film can be made. Also, the welding layer cannot be thinner because it is necessary to ensure adhesive strength. Generally speaking, the lower limit of thickness of an aluminum laminate film is about 90 μm, and further reduction in thickness is difficult for conventional laminated rechargeable elements. In particular, as for sheet-shaped information recording media and electronic devices (e.g., smart cards, Integrated Circuit tags; hereinafter collectively referred to as a smart card) described in NPL 1 and the like, laminated rechargeable elements which are built into such media and devices have an extremely thin thickness of less than 1 mm, and the jacket and all other components of these rechargeable elements are made as thin as possible. Thus, it can be said that reduction in thickness has reached a limit.

Conceivably, a stainless steel laminate film whose substrate is stainless steel could be used for a jacket instead of an aluminum laminate film whose substrate is aluminum film. As is well known, stainless steel is a material that is largely corrosion-proof, and therefore even when being thinner than aluminum film, high strength can be ensured. But, stainless steel is a hard material. So, unlike aluminum laminate film, which is flexible, stainless steel laminate film cannot be restored to its original shape once it has been bent or twisted. If the shape is forcibly restored by exerting an external force on it, the bent portions become creased and remain creased. If, for example, a laminated rechargeable element built into a smart card is creased, this damages the flatness of the smart card itself, making the creased portions thicker. The thicknesses of the smart cards is strictly specified by standard, and therefore creases of the laminated rechargeable element makes it impossible to insert the smart card into a smart card slot of an electronic device. If such a smart card is forcibly inserted, there is a possibility that the smart card cannot be removed.

In laminated rechargeable elements including those for smart cards, when creases occur in the jacket surface, each such crease has a shape in which its top is bent sharply. When the top of such a crease comes into contact with the electrode assembly inside the jacket, the following phenomena will occur: Partial contact faults occur between the current collector and the electrode; deformation of an electrode makes discharge unstable; and internal short-circuits occur. In some cases, it could also cause a substantial reduction of discharge capacity (a phenomenon called "discharge shortfall") in which discharge becomes impossible at a time of discharging an amount considerably smaller than the design capacity. Conceivably, by replacing the electrolyte with high-viscosity polymer electrolyte, the jacket is supported from the inside of the rechargeable element to make the jacket difficult to bend. But, since the ionic conductance of polymer electrolyte is lower than that of the electrolyte, a laminated rechargeable element using polymer electrolyte cannot achieve sufficient discharge performance. In particular, in the case of a laminate-film rechargeable element whose thickness is as small as possible so that it can be built into the foregoing smart card, components contributing to discharge (e.g., current collector, electrodes) are as thin as possible to maintain discharge performance. Accordingly, it is actually impossible to further lower discharge performance.

According to this disclosure, an improved laminated rechargeable element includes a jacket and an electrode assembly. The jacket is formed of two flat, rectangular stainless steel laminate films welding together at their peripheries. The electrode assembly includes a sheet-shaped positive electrode, a sheet-shaped negative electrode, and a separator interposed between the positive electrode and the negative electrode, the electrode assembly accommodated in the jacket together with an electrolyte. The separator includes an ion-permeable substrate and ion-permeable bonding layers formed on a top surface and a bottom surface of the substrate. The positive electrode and the negative electrode are welded to respective bonding layers of the separator. The jacket is welded to the electrode assembly.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF EMBODIMENTS

Figure 1A:
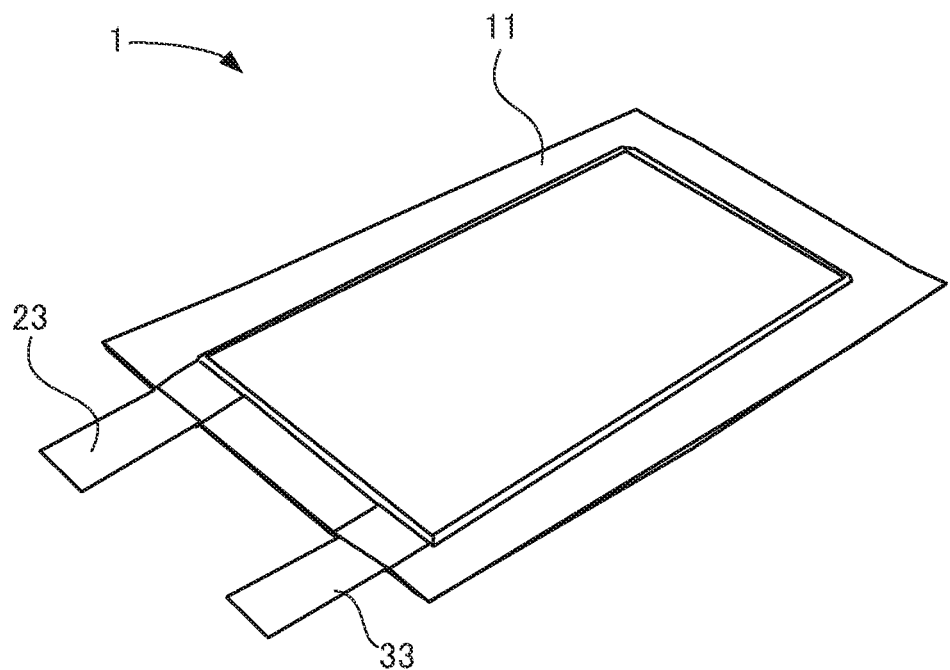
FIG. 1A is a diagram showing the structure of a laminated rechargeable element.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a laminated rechargeable element according to embodiments of the present disclosure are described. As used herein, the singular forms "a", "an", and "the" are intended to include the plural forms as well, unless the context clearly indicates otherwise.

Structure

Figure 1B:
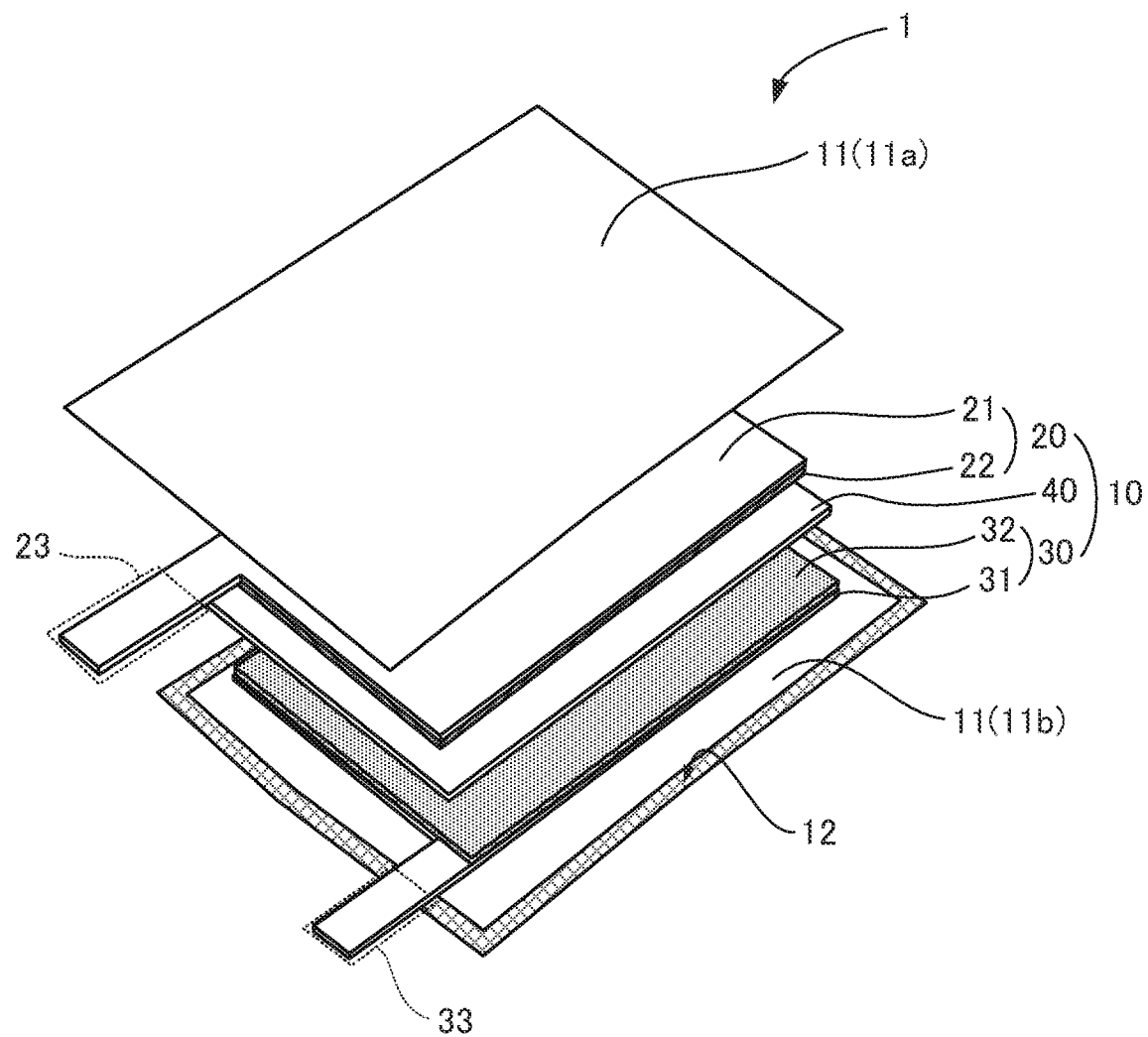
FIG. 1B is a diagram showing the structure of a laminated rechargeable element.
Figure 2A:
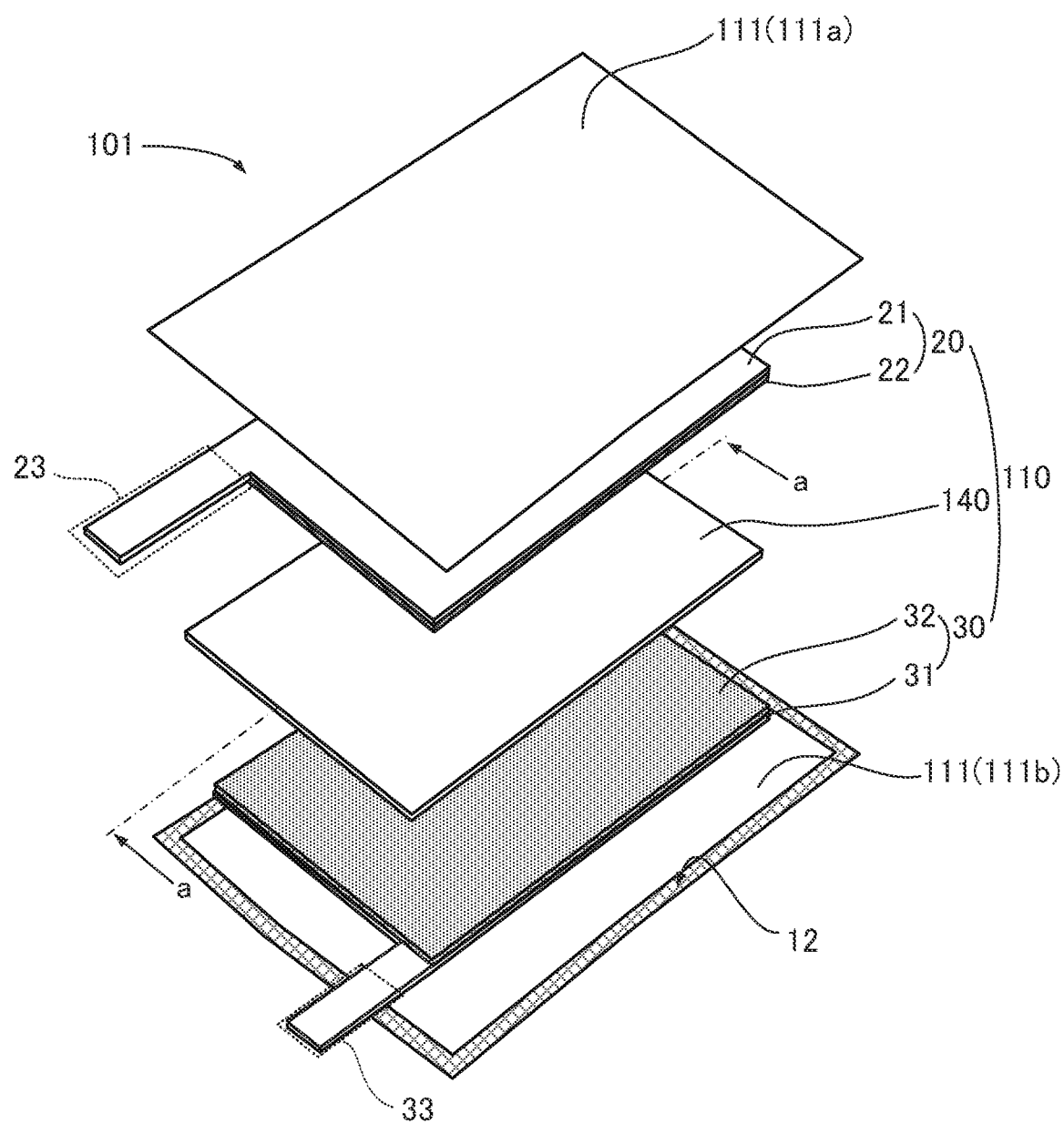
FIG. 2A is a diagram showing a laminated rechargeable element according to an embodiment of this disclosure.
Figure 2B:
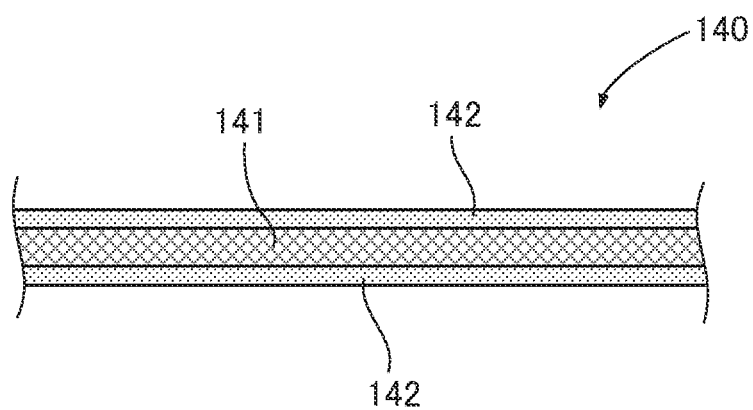
FIG. 2B is a diagram showing a laminated rechargeable element according to an embodiment of this disclosure.

FIGS. 2A and 2B show the structure of a laminated rechargeable element according to an embodiment of this disclosure (hereinafter also referred to as a rechargeable element 101). FIG. 2A is an exploded perspective view showing the internal structure of the rechargeable element 101. FIG. 2B is a diagram showing the structure of a separator 140 constituting the rechargeable element 101, and is a cross-sectional view along line a-a in FIG. 2A. As shown in FIG. 2A, the rechargeable element 101 has a configuration and a structure similar to the laminated rechargeable element 1 shown in FIG. 1B. But, it is different in that the substrate of a jacket 111 is stainless steel laminate films (111a, 111b) using stainless steel thin plate. In order to prevent the occurrence of the above-mentioned "creases" on the stainless steel laminate films (111a, 111b), the separator 140 has a configuration in which bonding layers 142 made of resin are formed on the top and bottom surfaces of a substrate 141 as shown in FIG. 2B. Of course, the substrate 141 and the bonding layers 142 are both ion-permeable. In the embodiment, the separator 140 is used in which polyvinylidene difluoride (PVdF) is applied to the top and bottom surfaces of the substrate 141 made of sheet-shaped polyethylene. The configuration of the electrode assembly 110 except for the separator 140 is similar to the electrode assembly 10 of the laminated rechargeable element 1 shown in FIGS. 1A and 1B, and the structure and the external dimensions of the common configuration are substantially identical to a commercially-available, thin lithium battery (e.g., CF052039) described in the NPL 1, for example. The manufacturing processes of the rechargeable element 101 according to the embodiment are slightly different from those of conventional rechargeable elements because of structural differences of the jacket 111 and the separator 140.

Manufacturing Processes

The manufacturing processes of the rechargeable element 101 are described concretely below. The positive electrode 20 constitutes the electrode assembly 110, and is made by applying slurry-formed cathode material 22 onto a cathode current collector 21 made of aluminum film and drying it; the cathode material 22 is prepared by mixing electrolytic manganese dioxide (EMD; serving as active cathode material), carbon black (serving as a conductive additive) and fluorine-based binder in proportions of 93 wt %, 3 wt % and 4 wt % and by slurrying the mixture with pure water. The negative electrode 30 is made by press-bonding an anode collector 31 made of copper foil to foil-shaped negative electrode lithium 32. The positive electrode 20 and the negative electrode 30 are laminated with the separator 140 interposed between them and with the cathode material 22 and the negative electrode lithium 32 facing each other, and they are press-bonded, to form the electrode assembly 110. In other words, the cathode material 22 of the positive electrode 20 is welded to the bonding layer 142 of one surface of the separator 140, and the negative electrode lithium 32 of the negative electrode 30 is welded to the bonding layer 142 of the other surface of the separator 140.

The jacket 111 is formed by welding together the peripheries 12 of two sheets of stainless steel laminate films 111a, 111b, each have a substrate of sus304 having a thickness of 60 μm, by thermocompression bonding, thereby sealing the interior of the jacket 111. The jacket 111 accommodates the electrode assembly 110 as follows: Two facing stainless steel laminate films 111a, 111b are shaped into the form of a bag by welding three sides of the rectangle and by leaving the remaining one side as an opening; the bag-shaped, stainless steel laminate films 111a, 111b accommodates the electrode assembly 110; the terminal plates 23, 33 of the positive and negative electrodes 20, 30 protrude beyond the jacket 111 from the opening of the bag-shaped stainless steel laminate films 111a, 111b; electrolyte is prepared by dissolving lithium trifluoromethanesulfonate (serving as supporting electrolyte) to a concentration of 0.8 mol/l in a non-aqueous solution in which propylene carbonate (PC), ethylene carbonate (EC) and dimethoxyethane (DME) is the volume ratio of 20 vol %, 20 vol % and 60 vol %, and the electrolyte is injected inside the jacket 111; and the flat area of the electrode assembly 110 and the open side of the periphery 12 are welded together from the outside of the jacket 111 to complete the rechargeable element 101 according to the embodiment. Thus, in the rechargeable element 101, the jacket 111 and the electrode assembly 110 are also thermocompression bonded. That is, in the rechargeable element 101, the bonding layers 142 of the separator 140 are welded to the positive electrode 20 and the negative electrode 30, and inside the jacket 111, the welding layers (not shown) of the stainless steel laminate films 111a, 111b are welded to the cathode current collector 21 and the anode collector 31. Thus, the electrode assembly 110 is fixed inside the jacket 111. In other words, the electrode assembly 110 is fixed so that surfaces of the jacket 111 are along the flat area of the electrode assembly 110.

Test

Next, concerning the rechargeable element 101 according to the embodiment, under actual use conditions (e.g., being built into a smart card), it was examined whether or not creases appear in the jacket 111. Here, according to procedures prescribed by ISO/IEC 10373-1 (JIS X 6305) specifying test methods to evaluate the reliability of identification cards, a bending test in which the rechargeable element 101 was bent 500 times was carried out, after which the state of the jacket 111 was visually examined. In order to examine the corrosion resistance of the jacket 111, a reliability test in which the rechargeable element 101 was left at 60° C. and at 90% RH for 10 days was carried out. In addition, as comparative examples for the rechargeable element 101 according to the embodiment, the following comparative examples A and B were prepared and subjected to the foregoing bending test and reliability test: Comparative example A is a rechargeable element which is prepared by the foregoing procedures and constructed of stainless steel laminate films 111a, 111b and a separator 40 made of only polyethylene without bonding layers 142 similar to the laminated rechargeable element 1, and Comparative example B is a rechargeable element which is prepared by the foregoing procedures and in which the substrate of the jacket 111 is replaced with aluminum laminate films 11a, 11b compared to the rechargeable element 101 according to the embodiment. Every time a test was conducted, 100 rechargeable elements of each type were prepared.

TABLE 1 below shows the results of the bending test and the reliability test for the embodiment and the comparative examples A and B.

TABLE 1

| Rechargeable element | Structure | | Test | |
|---|---|---|---|---|
| | Jacket | Separator | Bending test | Reliability test |
| Embodiment | Stainless Steel | w/ bonding layer | ○ All Acceptable | ○ All Acceptable |
| Comparative example A | Stainless Steel | w/o bonding layer | x All Rejected | ○ All Acceptable |
| Comparative example B | Aluminum | w/ bonding layer | ○ All Acceptable | x All corroded (some leak) |

TABLE 1 shows structures and test results of examined rechargeable elements of the embodiment, the comparative example A and the comparative example B. In test results, acceptance is indicated by symbol "○", and rejection is indicated by symbol "x", and details thereof are also described. As shown in TABLE 1, in the rechargeable element 101 according to the embodiment, there was no sample which had creases after the bending test, and there was no sample whose jacket had alteration (e.g., corrosion) after the reliability test. Of course, no leakage occurred. In contrast, in the rechargeable element according to the comparative example A, all samples had creases in the bending test. This is caused by the configuration of the comparative example A in which, though the stainless steel laminate films 111a, 111b are used for the jacket 111, the separator 40 does not have a bonding layer 142. That is, the electrode assembly and the jacket 111 are not fixed relative to each other, and therefore, once the jacket 111 is bent, it is impossible to restore the bent portion along the flat area of the electrode assembly, which results in creases. It should be noted that because the rechargeable element according to the comparative example A has the jacket 111 made of stainless steel laminate films 111a, 111b similar to the rechargeable element 101 according to the embodiment, no such sample showed corrosion in the jacket 111 in the reliability test. In the rechargeable element according to the comparative example B whose jacket 11 is made of aluminum laminate films 11a, 11b, there was no sample whose jacket 11 had creases after the bending test. But, in the reliability test, the jackets 11 of all such samples had corrosion, and many of the samples leaked. Thus, in the reliability test for the rechargeable element according to the comparative example B, a problem of rechargeable elements having the jacket 11 made of the aluminum laminate films 11a, 11b has been found. It should be noted that the rechargeable element 101 according to the embodiment ensures discharge performance equivalent to commercially-available rechargeable elements described in NPL 1.

Other Embodiments

The structure of a laminated rechargeable element 101 according to the embodiment is not limited to that described above. Thus, for example, alternatively, the positive electrode 20 may be formed by using a current collector 21 made of expanded metal, etc. and applying cathode material 22 onto the top and bottom surfaces of such current collector 21. Moreover, the type of rechargeable element according to this disclosure is not limited to a laminated lithium primary battery, and this disclosure may be applied to various types of laminated rechargeable element (e.g., a lithium secondary battery, an electric double-layer capacitor, etc.).

As for a rechargeable element, there is an extremely high demand for reduction in thickness, and the foregoing embodiment shows a rechargeable element whose jacket accommodates only an electrode assembly including one layer composed of one pair of sheet-shaped positive and negative electrodes. However, this disclosure may also be applied to a rechargeable element whose jacket accommodates a multi-layered electrode assembly, in which a plurality of electrode assemblies is laminated.

What is claimed is:

1. A laminated lithium primary battery, comprising:
    a jacket formed of two flat, rectangular stainless steel laminate films welding together at their peripheries; and
    an electrode assembly including a flat positive electrode, a flat negative electrode, and a separator interposed between the positive electrode and the negative electrode, the electrode assembly accommodated in the jacket together with an electrolyte,
    the separator including an ion-permeable substrate and ion-permeable bonding layers formed on a top surface and a bottom surface of the substrate,
    the positive electrode and the negative electrode welded to respective bonding layers of the separator,
    both inner surfaces of the jacket welded to the electrode assembly along either side of top and bottom surfaces of the electrode assembly.

2. The laminated lithium primary battery according to claim 1, wherein:
    the substrate is made of polyethylene film, and
    the bonding layers are made of polyvinylidene difluoride.

3. The laminated lithium primary battery according to claim 1, wherein:
    the electrode assembly includes one flat positive electrode and one flat negative electrode, and
    the laminated lithium primary battery is built into one of a sheet-shaped information recording medium and a sheet-shaped electronic device.

4. The laminated lithium primary battery according to claim 2, wherein:
    the electrode assembly includes one sheet-shaped positive electrode and one sheet-shaped negative electrode, and
    the laminated lithium primary battery is built into one of a sheet-shaped information recording medium and a sheet-shaped electronic device.

* * * * *